United States Patent [19]

Hosokawa et al.

[11] 4,426,206

[45] Jan. 17, 1984

[54] TEXTILE PRINTING PASTE COMPOSITION WITH HIGHLY SUBSTITUTED CARBOXYMETHYL CELLULOSE

[75] Inventors: Teijiro Hosokawa; Shigetoshi Kako; Kazuyuki Hagino, all of Kyoto, Japan

[73] Assignee: Dai-Ichi Kogyo Seiyaku Co., Ltd., Kyoto, Japan

[21] Appl. No.: 502,847

[22] Filed: Jun. 9, 1983

Related U.S. Application Data

[63] Continuation-in-part of Ser. No. 347,126, Feb. 9, 1982.

[30] Foreign Application Priority Data

Mar. 9, 1981 [JP] Japan ................................ 56-034357

[51] Int. Cl.$^3$ .......................... C09D 17/00; D06P 1/50
[52] U.S. Cl. ........................................... 8/528; 8/559; 8/562
[58] Field of Search ....................... 8/528, 559; 536/98

[56] References Cited

U.S. PATENT DOCUMENTS

| | | | |
|---|---|---|---|
| 4,063,018 | 12/1977 | Ohnaka et al. | 536/98 |
| 4,192,647 | 3/1980 | Kuryla et al. | 8/559 |
| 4,254,258 | 3/1981 | Durso | 536/98 |
| 4,306,061 | 12/1981 | Majewicz | 536/98 |

FOREIGN PATENT DOCUMENTS

45-1671 1/1970 Japan.
818750 8/1959 United Kingdom.

*Primary Examiner*—A. Lionel Clingman
*Attorney, Agent, or Firm*—Millen & White

[57] ABSTRACT

A textile printing paste composition comprising an alkali metal salt of carboxymethylcellulose having an average degree of substitution of at least 2.2 per glucose unit, the aqueous solution of said salt in the concentration of 2% on the anhydrous basis having a viscosity of 10 to 10,000 cps as measured in a B-type rotational viscometer at 20 rpm at 25° C. The composition can meet the basic performance characteristic requirements for use in textile printing.

7 Claims, No Drawings

TEXTILE PRINTING PASTE COMPOSITION WITH HIGHLY SUBSTITUTED CARBOXYMETHYL CELLULOSE

BACKGROUND OF THE INVENTION

This application is a continuation-in-part of our co-pending application Ser. No. 347,126, filed Feb. 9, 1982.

This invention relates to a novel textile printing paste composition.

Textile printing paste (hereinafter simply called "paste") is a medium used in printing processes for fixing and holding a pattern on a cloth to be printed and thereby maintaining and reproducing a colored image on said cloth. Colored paste compositions, which are generally prepared by adding to said paste dyestuffs, if necessary together with an acid, alkali, anti-reducing agent, etc., are essential in printing processes.

The basic performance characteristics required of paste compositions include water solubility, heat stability, stability in viscosity upon storage, stability against mechanical stirring, acid resistance, alkali resistance, salt resistance, antimicrobial property, reduction resistance, and compatibility, among others. Reproducibility of the pattern appearing after completion of the printing process, quality of surface color development, quality of level dyeing, sharpness of dyeing, paste removability and so on also play important roles.

In preparing paste compositions, natural or semisynthetic, amorphous, solid, water-soluble high molecular compounds colloidally soluble in water and capable of giving a high viscosity in a relatively low concentration are generally used. Thus, starch and derivatives thereof, natural gums (such as galactomannan), sodium alginate, and cellulose derivatives (typically carboxymethylcellulose), among others, have been used generally and widely depending on the kind of processing.

However, such conventional paste bases cannot meet all the basic performance requirements mentioned above. Starch and derivatives thereof are advantageous with respect to quality of surface color development in printing processes but unsatisfactory with respect to stability against mechanical stirring, acid resistance, reduction resistance, quality of level dyeing, sharpness of dyeing, paste removability, and so on. Natural gum such as galactomannan are virtually satisfactory with respect to such performance characteristics as stability against mechanical stirring, acid resistance and resistance to chemicals, but are insufficient in reduction resistance, antimicrobial property, quality of surface color development, and so forth; they are fatally defective in paste removability in high temperature dyeing processes using a high temperature steamer or thermosol, for instance. Sodium alginate can afford excellent level dyeing and paste removability but is unsatisfactory with respect to heat stability, acid resistance, alkali resistance and quality of surface color development. Carboxymethylcellulose with a degree of substitution of 0.4 to 0.6, which is most widely used among cellulose derivatives, is satisfactory with respect to such performance characteristics as quality of surface color development, paste removability, heat stability and anti-microbial property, but is defective in acid resistance, alkali resistance, resistance to other chemicals, stability against mechanical stirring, quality of level dyeing, etc.

As mentioned above, the prior art paste bases each has its own drawbacks although they have respective characteristic features depending on the chemical composition and structure. As a result, they cannot meet all the performance characteristics requirements when used alone, and therefore they are often used in combination of two or more of them depending upon method of printing, textile material, coloring agent, etc.

DESCRIPTION OF THE INVENTION

We have found that an alkali metal salt of carboxymethylcellulose having an average degree of substitution of at least 2.2 per glucose unit, the aqueous solution of which salt in the concentration of 2% on the anhydrous basis has a viscosity of 10 to 10,000 cps as measured in a B-type rotational viscometer at 20 rpm at 25° C., can meet the basic performance characteristic requirements for printing paste bases and can produce excellent results in printing. Thus, it has been found that the above-mentioned alkali metal salt of carboxymethylcellulose having a high degree of substitution, when used as a medium in printing, solves the problems encountered with the conventional paste components with respect to such fundamental properties as water solubility, heat stability, stability in viscosity during storage, stability against mechanical stirring, acid and alkali resistance, resistance to chemicals, antimicrobial property, reduction resistance and compatibility, and provides, owing to adequate flowability of the composition containing the same, definite surface color development, marked level dyeing and sharpness of dyeing on the cloth, and moreover is superior in paste removability to sodium alginate which ranks highest among the paste bases with respect to paste removability.

Carboxymethylcellulose (hereinafter referred to as CMC) is, as is well known, produced by reacting an alkali cellulose with monochloroacetic acid so as to form an ether linkage. Since cellulose has 3 etherifiable OH groups per glucose unit, the theoretical maximum degree of substitution of CMC is 3.0. The flowability of an aqueous solution of CMC and the performance characteristics of a printing paste in which the aqueous solution is used depend on not only the degree of substitution of CMC but also the cellulose molecule length. The cellulose molecule length is generally represented by the average degree of polymerization, which in turn may be represented by the viscosity of a solution of CMC since the viscosity is generally proportional to the average degree of polymerization.

Generally, adjustment of the degree of substitution and average degree of polymerization (or viscosity) can give CMC with desired properties. In conventional paste compositions, most widely used is that grade of CMC in which the degree of substitution is 0.4–0.6 and the viscosity of the aqueous solution having the concentration of 2% on the anhydrous basis is within the range of 5–5,000 cps as measured in a B-type rotational viscometer at 20 rpm at 25° C., followed by the grade in which the degree of substitution is 0.7–1.0 and the viscosity 10–1,000 cps, the grade in which the degree of substitution is 1.3–1.5 and the viscosity 10–6,000 cps, and the grade in which the degree of substitution is 1.6–1.85 and the viscosity 100–4,000 cps, depending on the kind of processing. Among the above-mentioned grades of CMC, those with degrees of substitution of up to 0.7–1.0 can be prepared by one-step reaction of an alkali cellulose with monochloroacetic acid, whereas those with degrees of substitution of 1.3–1.5 and 1.6–1.85 are prepared by two-step reaction using the product of the one-step reaction as the starting material. However, the highest degree of substitution achievable in practice by two-step reaction is at most 2.0.

The above-mentioned grades of CMC, for which the industrial production technology has already been established, are being supplied in large quantities at relatively low prices for use in a wide variety of industrial fields, such as textile (for use in printing paste compositions), paper, ceramic, building materials, petroleum and cosmetics industries.

However, each of such grades of CMC, when used as a printing paste base, has its limit in performance. Thus, a considerable degree of improvement has been attained but to a still unsatisfactory extent in water solubility, heat stability, stability in viscosity during storage, antimicrobial property, surface color development, and paste removability, for instance. The above-mentioned grades are still unsatisfactory in such performance characteristics as stability against mechanical stirring, acid and alkali resistance, resistance to other chemicals, reduction resistance, compatibility, quality of level dyeing and sharpness of dyeing although a tendency toward improvement can be seen with the increase in degree of substitution.

The CMC species to be used in accordance with the present invention, in which species the degree of substitution is at least 2.2 and the viscosity is within the range of 10–10,000 cps, in spite of theoretical possibility of production, have not been produced on a commercial scale because of technological and economic difficulties concerned with selection of starting material, kind of solvent, reaction conditions, solvent recovery, purification, etc.

We have separately elaborated a method of producing CMC with a degree of substitution of at least 2.2 with a satisfactory result and consequently have endeavored to find uses for the same and it has now been found that such CMC is unexpectedly excellent as a printing paste base and, even when used alone in an alkali metal salt form without any other paste base, can meet the fundamental and practical performance characteristic requirements. This finding has led to the present invention.

Briefly speaking, the above method for producing CMC having a DS of at least 2.2 is characterized by a series of repetitive carboxymethylation of alkali cellulose with monochloroacetic acid in aqueous isopropanol. In which method the product of a preceding step is used as the starting material in the next step and this carboxymethylation is repeated until the desired DS is reached.

The alkali metal salt of CMC to be used in practicing the invention must have a degree of substitution of at least 2.2, preferably at least 2.5. When the degree of substitution is less than 2.2, sodium alginate cannot be surpassed in paste removability.

The alkali metal salt of CMC to be used in accordance with the invention gives to a 2% aqueous solution thereof a viscosity within the range of 10–10,000 cps, preferably 100–6,000 cps. At a lower viscosity than 10 cps, an excessively large amount of solid matter will be required to prepare a color paste with an adequate viscosity, resulting in a decrease in degree of exhaustion of dyes, in a decrease in quality of surface dyeing and contamination of printing tables as a result of increased color penetration to the back, and furthermore in economic difficulty. At a higher viscosity than 10,000 cps also is inadequate since shortage of solid matter in color paste tends to result and cause such problems as cracked paste, color migration and bleeding due to decreased film strength, as well as blurred pattern due to insufficiency in quantity of color retainable on the cloth.

The textile printing paste base according to the present invention can be used in preparing color paste compositions using direct dyes, acid dyes, disperse dyes, naphthol dyes, Rapidogen brand (Bayer AG Leverkusen, Germany) of azoic dyes which are diazoamino compounds which are split by organic compounds or by heat into diazo compounds which couple with naphtholates to form insoluble azo dyestuffs, vat dyes, metal complex dyes, pigments, reactive dyes, etc.

Various dyeing assistant auxiliaries commonly used in preparing color paste compositions for various textile materials with such coloring agents, such as acids, for example organic acids (e.g. citric acid, tartaric acid, malic acid, acetic acid) for pH adjustment, reduction inhibitors (e.g. sodium chlorate, sodium m-nitrobenzenesulfonate), urea, alkalis (e.g. sodium bicarbonate, soda ash, caustic soda), salts (e.g. ammonium sulfate, ammonium tertrate), solvents for dyes, antifoaming agents, penetrating agents, retarding agents, leveling agents, deep dyeing agents, damping agents, moisture retaining agents and so on can be used in combination without substantial adverse effects.

Whereas single use of the printing paste base of the present invention can afford necessary fundamental functions and printing effects to a satisfactory extent, it is possible to combinedly use such conventional paste bases compatible therewith as starch, modified starch products, guar gum, locust bean gum, gum arabic, cyrstal gum, gum tragacanth, tamarind gum, sodium alginate and existing grades of CMC, if use of such is deemed necessary in preparing printing paste compositions.

In cases where a reactive dye, which may be either of the triazine type or of the vinylsulfone type, is used, dyeing is completed by such a mechanism that the dye reacts with the OH group of fiber cellulose, and therefore the reactive dye can react also with natural highmolecular polysaccharides containing free OH groups, namely printing paste bases such as starch, natural gums and conventional CMC species, whereupon gelation takes place and dyeing is thereby obstructed. Accordingly these paste bases cannot be used as printing paste for use with reactive dyes.

On the other hand, sodium alginate, unlike other high-molecular polysaccharides, has a structure such that the OH groups contained therein are secondary OH groups and therefore are very low in reactivity, with all the highly reactive primary OH groups being substituted by COOH or COONa groups. As a result, sodium alginate as a whole is very low in reactivity with reactive dyes. This is the reason why sodium alginate can be used in preparing color paste compositions in printing general cellulose fiber products with reactive dyes. The above fact suggests that natural high-molecular polysaccharides might become usable, like sodium alginate, in preparing color paste compositions containing reactive dyes if either the primary OH groups contained therein could selectively be blocked or all the OH groups contained therein could be blocked. For CMC, however, selective blocking of primary OH groups alone is impossible since its primary and secondary OH groups are more or less reactive. For instance, a study of a CMC species having a degree of substitution of 0.91 for substitution degree distribution gave the following results:

| Position of OH group | 6-position (primary) | 2-position (secondary) | 3-position (secondary) |
|---|---|---|---|
| Proportion | 48.5% | 24.8% | 15.4% |

The conclusion is that the only way of blocking the highly reactive primary OH groups is to increase the overall degree of substitution.

Those grades of CMC in which the degrees of substitution are, respectively, 0.4–0.6, 0.8–1.0, 1.3–1.5 and 1.7–1.85 have so far been used as paste bases, but each of them cannot be used singly because it still remains reactivity with reactive dyes. Only that grade of CMC in which the substitution degree is 1.7–1.85 is used in some instances but in combination with sodium alginate, but there remains a problem to be solved with respect to hand.

To sum up, the above-mentioned grades of CMC produced by the one-step or two-step process cannot become media in printing with reactive dyes, failing to replace sodium alginate.

Only those CMC species in which the degree of substitution is at least 2.2, which species are now commercially producible by the process successfully developed by the present inventors, can replace sodium alginate and be used as media in printing with reactive dyes, and moreover are superior in paste removability to sodium alginate.

The following examples illustrate the invention. In the examples, "%" in each occurrence is "%" by weight.

EXAMPLE 1

Preparation of CMC having a high DS

A flask was charged with 300 g of pulverized cotton linter pulp and 2300 g of 84% aqueous isopropanol containing 315 g of sodium hydroxide. The mixture was stirred at 30°–35° C. for 50 minutes. To the mixture was added 540 g of 65% solution of monochloroacetic acid in isopropanol over 70 minutes while maintaining the mixture at a temperature below 40° C. The mixture was gradually heated to boiling over 30 minutes, refluxed for 70 minutes and cooled to 35° C.

To the mixture were added 144 g of sodium hydroxide flakes and 152 g of sodium monochloroacetate (90%) and the mixture stirred at 35°–40° C. for 20 minutes. To the mixture was added 170 g of 65% solution of monochloroacetic acid in isopropanol over 30 minutes at a temperature of 40°–45° C. The mixture was gradually heated to boiling over 20 minutes, refluxed for 50 minutes and then cooled to 35° C.

To the reaction mixture was added 136 g of sodium hydroxide flakes and the mixture stirred at 35°–40° C. for 20 minutes. To this mixture was added 310 g of 50% solution of monochloroacetic acid in isopropanol over 40 minutes at a temperature of 40°–50° C. The mixture was gradually heated to boiling over 20 minutes, refluxed for 50 minutes and then cooled to 50° C. The mixture was neutralized and filtered to remove solvent. The resultant product was suspended in 12 times volume of 80% methanol while hot, stirred, filtered and dried. 622 g of CMC having a DS of 2.32 and a viscosity of 1,080 cps (2%, at 25° C.) was obtained. Moisture content and NaCl content were 5.2% and 1.8%, respectively.

The following grades of sodium salt of CMC were similarly prepared:

(A) Substitution degree 2.21, viscosity (as measured for an aqueous solution having the concentration of 2% on the anhydrous basis by using a B-type rotational viscometer at 20 rpm at 25° C.; the same shall apply hereinafter) 682 cps (Paste base A);

(B) Substitution degree 2.21, viscosity 1,408 cps (Paste base B);

(C) Substitution degree 2.40, viscosity 900 cps (Paste base C); and (D) Substitution degree 2.74, viscosity 1,550 cps (Paste base D).

The above paste bases A to D were tested for fundamental physical characteristics and aptitude for use in printing in comparison with several conventional paste bases. The results obtained were as shown in below in Table 1.

It was thus demonstrated that paste bases A–D are superior to any of the conventional paste bases tested in fundamental physical properties and in aptitude for use in printing.

TABLE 1

| Paste base Property | Stock paste Viscosity (2%), cps | Stock paste Concentration, % | Flowability PVI value | Stability in viscosity upon storage % | Stability against mechanical stirring, % |
|---|---|---|---|---|---|
| Starch derivative | — | 10.0 | 0.28 | 91 | −48 |
| Sodium alginate (Medium viscosity grade) | — | 5.7 | 0.84 | 112 | 10 |
| Galactomannan derivative | | | | | |
| (Low viscosity grade) | 10 | 27.0 | 0.63 | 100 | 28 |
| (Medium viscosity grade) | 170 | 10.0 | 0.70 | 98 | 17 |
| (High viscosity grade) | 270 | 5.0 | 0.52 | 96 | 10 |
| Cellulose derivative | | | | | |
| Low degree of substitution (0.4–0.6) | | | | | |
| (Low viscosity grade) | 8 | 28.5 | 0.50 | 98 | 11 |
| (High viscosity grade) | 1500 | 5.5 | 0.34 | 93 | 17 |
| Medium degree of substitution (0.7–1.0) | | | | | |
| (Low viscosity grade) | 15 | 20.0 | 0.56 | 100 | 8.0 |
| (Medium viscosity grade) | 350 | 11.0 | 0.75 | 98 | 5.0 |
| High degree of substitution (1.3–1.5) | | | | | |
| (Low viscosity grade) | 13 | 38.0 | 0.90 | 98 | 7.0 |
| (Medium viscosity grade) | 350 | 10.0 | 0.80 | 98 | 6.0 |

TABLE 1-continued

| | | | | | |
|---|---|---|---|---|---|
| (High viscosity grade) High degree of substitution (1.6-1.85) | 6000 | 4.0 | 0.53 | 90 | −2.1 |
| (Medium viscosity grade) | 200 | 11.0 | 0.66 | 95 | 4.0 |
| (High viscosity grade) | 3000 | 5.5 | 0.48 | 90 | −2.0 |
| Paste base A | 682 | 7.5 | 0.81 | 100 | 0 |
| Paste base B | 1408 | 6.0 | 0.76 | 99 | 0 |
| Paste base C | 900 | 6.5 | 0.70 | 99 | 0 |
| Paste base D | 1550 | 6.0 | 0.74 | 100 | 0 |

| Acid resistance % | | Resistance to chemicals % | | Aptitude for use in printing (with a disperse dye) | | | |
|---|---|---|---|---|---|---|---|
| 0.5% Citric acid | 3% Tartaric acid | Urea | Sodium bicarbonate | Surface color development | Levelness of dyeing | Sharpness | Paste removability |
| 64 | 7 | 52 | 39 | O | X~XX | XX | X |
| 10 | 40 | 42 | 28 | XX | ◎ | O | ◎ |
| 93 | 93 | 64 | 87 | O | O | ◎ | Δ~X |
| 79 | 70 | 89 | 59 | O | O | O | X |
| 59 | 97 | 90 | 43 | Δ~X | X | X | XX |
| 93 | 228 | 61 | 83 | Δ | Δ~X | O | O |
| 100 | Gelation | 66 | 149 | O | X | Δ~X | Δ |
| 107 | 233 | 65 | 85 | O | O~Δ | O | O |
| 82 | 278 | 70 | 113 | O | Δ | O~Δ | O |
| 92 | 175 | 53 | 85 | Δ~X | O | ◎ | ◎ |
| 79 | 88 | 70 | 84 | Δ | O~Δ | O~Δ | O~Δ |
| 43 | 105 | 72 | 86 | Δ | Δ | X | Δ |
| 86 | 89 | 73 | 85 | Δ | O~Δ | O~Δ | O~Δ |
| 65 | 66 | 70 | 82 | Δ | O~Δ | Δ | Δ |
| 94 | 105 | 89 | 95 | O~◎ | ◎ | ◎ | ◎ |
| 95 | 101 | 92 | 98 | O~◎ | ◎ | ◎ | ◎ |
| 95 | 100 | 93 | 98 | O~◎ | ◎ | ◎ | ◎ |
| 99 | 100 | 99 | 98 | O~◎ | ◎ | ◎ | ◎ |

EXAMPLE 2

Aqueous solutions (stock paste compositions) having a prescribed concentration were prepared respectively using paste bases B or D mentioned in Example 1, and screen printing of a polyester fiber cloth with a disperse dye was conducted. The color paste had the following composition:

| | |
|---|---|
| Kayalon PE Blue 2R-SF (liquid) | 6% |
| Citric acid | 0.5% |
| Stock paste | 60% |
| Water | Proper quantity |
| Total | 100 |

The color paste viscosity was 10,000±500 cps (B-type R No. 5, 20 rpm, 25° C.).

After preliminary drying, steaming was carried out in an HT steamer at 180° C. for 5 minutes, followed by washing with water and soaping. The paste was easily removed by washing alone; the printed cloth was not stiffened at all. Each printing product was satisfactory in color value and in levelness and sharpness of dyeing.

EXAMPLE 3

Aqueous solutions (stock paste compositions) having a prescribed concentration were prepared respectively using paste bases C or D mentioned in Example 1, and screen printing of a nylon fiber cloth with an acid dye was performed. The color paste had the following composition:

| | |
|---|---|
| Telon Fast Navy Blue | 0.5% |
| Ammonium tartrate | 0.3% |
| Acetic acid | 0.5% |
| Colorsol TG | 1.0% |
| Stock paste | 60% |
| Water | Proper quantity |
| Total | 100 |

The color paste viscosity was 8,000±500 cps (B-type R No. 5, 20 rpm, 25° C.).

After preliminary drying, steaming was conducted in an HP steamer at 103° C. for 30 minutes, followed by washing and soaping. Good results as in Example 2 were obtained.

EXAMPLE 4

Aqueous solutions (stock paste compositions) having a prescribed concentration were prepared respectively using paste bases A to D mentioned in Example 1, and screen printing of a cotton cloth with a reactive dye was carried out. The color paste had the following composition:

| | |
|---|---|
| Remazol Black B | 6% |
| Sodium bicarbonate | 2% |
| Urea | 5% |
| Warm water | 27% |
| Stock paste | 60% |
| Total | 100 |

The color paste viscosity was 10,000±500 cps (B-type R No. 5, 20 rpm, 25° C.).

Printing was conducted 4 days after preparation of the color paste, followed by intermediate drying. Two days later, steaming was conducted in an HP steamer at 110° C. for 15 minutes, followed by washing and soaping. The paste was easily removed by washing, hence the printed portions were not stiffened at all. The printed products obtained were satisfactory in sharpness of dyeing, color value and levelness of dyeing.

In a control run, a 1:1 (by weight) mixture of sodium alginate (DACALGIN NPSM; viscosity of 1% solution 350 cps) and sodium salt of CMC (degree of substitution 1.50, viscosity of 2% aqueous solution 1,100 cps) was used as a paste base for comparison and tested by the same procedure. Removal of paste from the printed portions were insufficient even after washing and soaping, and said portions were stiff. Thus the desired quality of printing could not be attained.

EXAMPLE 5

The procedure of Example 4 was repeated except that the color paste had the following composition:

| | |
|---|---|
| Cibacron Pront Tuaquoise G | 6% |
| Sodium bicarbonate | 2% |
| Urea | 5% |
| Warm water | 27% |
| Stock paste | 60% |
| Total | 100 |

The color paste viscosity was 10,000±500 cps (B-type R No. 5, 20 rpm, 25° C.)

The results were quite the same as those obtained in Example 4.

The test methods used in the above examples were as follows:

(1) Flowability (PVI value)

The paste viscosity is adjusted to 8,000–10,000 cps (preferably 10,000 cps) as measured in a B-type rotational viscometer (rotor No. 5) at 20 rpm at 25° C. The paste is then subjected to viscosity measurement at 10 rpm and 100 rpm.

$$PVI\ (100/10) = \frac{\text{Viscosity value as obtained at 100 rpm}}{\text{Viscosity value as obtained at 10 rpm}}$$

If the PVI value is close to 1, the paste flows in a manner approximating Newtonian flow. As the value approaches to 0, the flow of paste approaches to plastic flow.

(2) Stability in viscosity during storage

A test printing paste is prepared by dissolving the test paste base in cold water by allowing to stand overnight so that a viscosity of 10,000 cps is obtained (B-type rotational viscometer, rotor No. 5, 20 rpm, 25° C.). The paste is tested for viscosity (A) directly after preparation thereof and viscosity (B) after storage in an electrically heated constant-temperature chamber at 40° C. for 7 days and the subsequent cooling to 25° C.

Values of viscosity (A) and viscosity (B), respectively;

$$\%\ \text{Viscosity retention} = \frac{(B)}{(A)} \times 100$$

(3) Resistance to acids and other chemicals

A test printing paste is prepared by dissolving the test paste base in cold water by allowing to stand overnight so that a viscosity of 10,000 cps is obtained (B-type rotational viscometer, rotor No. 5, 20 rpm, 25° C.).

(A) Blank: Viscosity measurement directly after preparation.

(B) Directly after chemicals addition: A chemical (see below*) is added to preparation (A), and the mixture is stirred for dissolution, allowed to stand for about 60 minutes, and then subjected to viscosity measurement.

(C) Viscosity measurement is made after storage in an electrically heated constant-temperature chamber at 40° C. for 7 days and the subsequent cooling to 25° C.

Viscosity values for (A), (B) and (C);

$$\%\ \text{Viscosity retention} = \frac{(B), (C)}{(A)} \times 100$$

*Chemicals added: citric acid, 0.5%/paste; urea, 10.0%/paste; tartaric acid, 3.0%/paste; sodium bicarbonate, 3.0%/paste.

(4) Stability against mechanical stirring

A test printing paste is prepared by dissolving the test paste base in cold water by allowing to stand overnight so that a viscosity of 20,000 cps is obtained (B-type rotational viscometer, rotor No. 6, 20 rpm, 25° C.).

(A) Blank: Viscosity measurement directly after preparation.

(B) After stirring: Viscosity measurement after stirring the preparation with a homo-mixer at 6,000 rpm for 5 ninutes.

Viscosity values for (A) and (B);

$$\text{Stability} = \frac{(B) - (A)}{(A)} \times 100\ (\%)$$

(5) Evaluation for adequateness for use in printing

A specific stock paste composition is prepared by dissolving the test paste base in cold water by allowing to stand overnight. Using this as a printing medium, a printing test is carried out under the conditions given below, and evaluation is made for ① color value, ② levelness of dyeing, ③ sharpness of dyeing and ④ paste removability according to the methods mentioned hereinbelow.

| (Printing conditions) | |
|---|---|
| Color paste formulation: | |
| Kayalon PE Blue 2R-SF (liquid) | 6% |
| Citric acid | 0.5% |
| Stock paste | 60% |
| Water | Proper quantity |
| Total | 100 |
| Viscosity: | 9,500 ± 500 cps (B-type, rotor No. 5, 20 rpm, 25° C.) |
| Screen: | 1,200 mesh |
| Preliminary drying: | 65–70° C. × 5 minutes |
| Steaming: | HTS - 175° C. × 8 minutes; HPS - 130° C. × 30 minutes |
| Soaping: | TRIPOL-TK 0.5 g/liter ⎫<br>Na₂S₂O₄ 1 g/liter ⎬ 65° C. × 5 minutes<br>Soda ash 1 g/liter ⎭ |

① Evaluation for color value (K/S value)

The printed cloth obtained under the above conditions is tested for reflectance with a photoelectric spectrophotometer. The reflectance value obtained is introduced into the Kubelka-Munk's formula to find the K/S value.

$$\text{Kubelka-Munk's formula}\ K/S = \frac{(1 - R)^2}{2R}$$

where R is the reflectance, K the absorption coefficient for the material, and S the scattering coefficient.

The K/S value thus obtained is evaluated according to the following criteria:

| K/S value | Evaluation |
|---|---|
| ≥4.0 | ⊚ |
| 3.5–4.0 | ○~⊚ |
| 3.0–3.5 | ○ |
| 2.5–3.0 | ○~Δ |
| 2.0–2.5 | Δ |
| 1.5–2.0 | Δ~X |
| 1.0–1.5 | X |
| ≤1.0 | XX |

② Levelness of dyeing

The printed cloth obtained under the above conditions is evaluated for possible specks or blotches on the printed face macroscopically by 10 panelists on the on-the-average basis.

| | |
|---|---|
| Very good levelness without any specks or blotches | ⊚ |
| Almost level dyeing without specks or blotches | ○ |
| A small number of specks and/or blotches | Δ |
| Unlevel dyeing with specks and/or blotches noticeable | X |
| Very unlevel dyeing with many specks and/or blotches | XX |

③ Sharpness of dyeing

A printed cloth obtained under the above conditions using a printing screen (1,200 mesh) with a pattern of wedges (base 10 mm, height 100 mm) drawn thereon is subjected to measurement of the height of the wedge printed thereon. The criteria for evaluation are as follows:

| Height (mm) | Evaluation |
|---|---|
| ≥99 | ⊚ |
| 96–98 | ○ |
| 93–95 | ○~Δ |
| 90–92 | Δ |
| 87–89 | Δ~X |
| 84–86 | X |
| ≤83 | XX |

④ Paste removability

The printed cloth obtained under the above conditions is evaluated for hand according to the following criteria by handling by 10 panelists:

| | |
|---|---|
| Very soft | ⊚ |
| Soft | ○ |
| Rather soft | Δ |
| Rather stiff | Δ~X |
| Stiff | X |
| Very stiff | XX |

The above has been offered for illustrative purposes only, and it is not the purpose of limiting the scope this invention which is defined in the claims below.

We claim:

1. A textile printing paste composition comprising an alkali metal salt of carboxymethylcellulose having an average degree of substitution of at least 2.2 per glucose unit, the aqueous solution of said salt in the concentration of 2% on the anhydrous basis having a viscosity of 10 to 10,000 cps as measured in a B-type rotational viscometer at 20 rpm at 25° C.

2. The textile printing paste composition of claim 1, wherein said viscosity is from 100 to 6,000 cps.

3. The textile printing paste composition of claim 1, wherein said degree of substitution is at least 2.5.

4. The textile printing paste composition of claim 2, wherein said degree of substitution is at least 2.5.

5. The textile printing paste composition of claim 1 further comprising a member selected from the group consisting of starch, a modified starch, a natural gum, sodium alginate, existing grades of CMC, and a mixtures thereof.

6. The textile printing paste composition of claim 1 further comprising a coloring agent and one or more members selected from the group consisting of an organic acids, urea, alkalis, salts, anti-reducing agents, solubilizing agents, antifoaming agents, penetrating agents, retarding agents, leveling agents, deep dyeing agents, damping agents and moisture retaining agents.

7. The textile printing paste composition of claim 6, wherein said coloring agent is selected from the group consisting of direct dyes, acid dyes, disperse dyes, naphthol dyes, azoic dyes which are diazoamino compounds which are split by organic compounds or by heat into diazo compounds which couple with naphtholates to form insoluble azo dyestuff, vat dyes, metal complex dyes, reactive dyes and pigments.

* * * * *